(12) United States Patent
Sala et al.

(10) Patent No.: US 8,856,850 B2
(45) Date of Patent: Oct. 7, 2014

(54) METHOD OF TAGGING SIGNALS USED FOR LEAKAGE DETECTION AND MEASUREMENT IN CABLE TELEVISION NETWORKS AND APPARATUS FOR DETECTION AND/OR MEASUREMENT OF LEAKAGE SOURCES TAGGED WITH THIS METHOD

(75) Inventors: Wojciech Sala, Bielsko Biala (PL); Jaroslaw Szostka, Poznan (PL)

(73) Assignee: Kabelkom SP. Z O.O., Bielsko-Biala (PL)

( * ) Notice: Subject to any disclaimer, the term of this patent is extended or adjusted under 35 U.S.C. 154(b) by 538 days.

(21) Appl. No.: 12/969,538

(22) Filed: Dec. 15, 2010

(65) Prior Publication Data
US 2011/0267474 A1 Nov. 3, 2011

(30) Foreign Application Priority Data
Apr. 29, 2010 (PL) ........................................ 391095

(51) Int. Cl.
*H04N 7/173* (2011.01)
*H04N 17/00* (2006.01)

(52) U.S. Cl.
CPC .................................... *H04N 17/00* (2013.01)
USPC ........... 725/107; 725/125; 725/105; 348/192; 348/193

(58) Field of Classification Search
USPC ............................................ 725/107; 348/180
See application file for complete search history.

(56) References Cited

U.S. PATENT DOCUMENTS

| 3,978,282 | A | * | 8/1976 | Fulton, Jr. ................... 178/69 G |
| 6,310,646 | B1 | * | 10/2001 | Shi et al. ........................ 348/194 |
| 6,559,756 | B2 | * | 5/2003 | Al-Araji et al. .......... 340/286.01 |
| 7,548,201 | B2 | * | 6/2009 | Eckenroth et al. ............ 342/418 |
| 2001/0032334 | A1 | * | 10/2001 | Dapper et al. ................ 725/105 |

* cited by examiner

*Primary Examiner* — Jun Fei Zhong
(74) *Attorney, Agent, or Firm* — Matthias Scholl, PC; Matthias Scholl

(57) ABSTRACT

A method of tagging signals for leakage detection and measurement in cable television networks which uses additional signals carrying the tagging information and transmitted in these networks. A narrowband tagging signal or signals are placed in the unused frequency spectrum parts of any used cable television channel, in particular in the guard bands (GB) of analog or digital channels, carrying, for example, television, radio or data services.

2 Claims, 6 Drawing Sheets

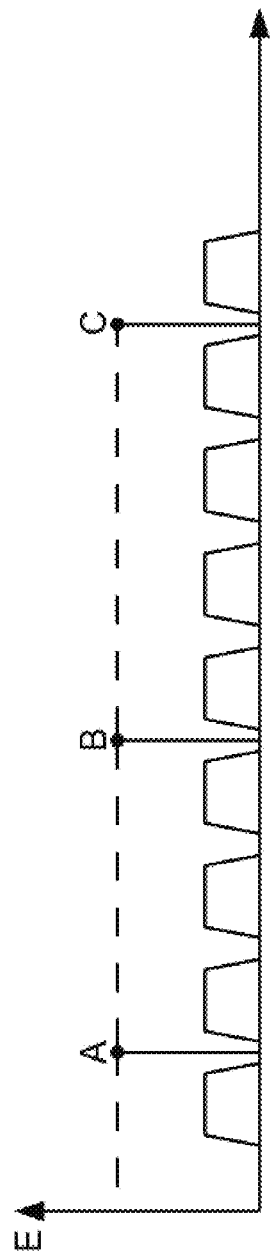
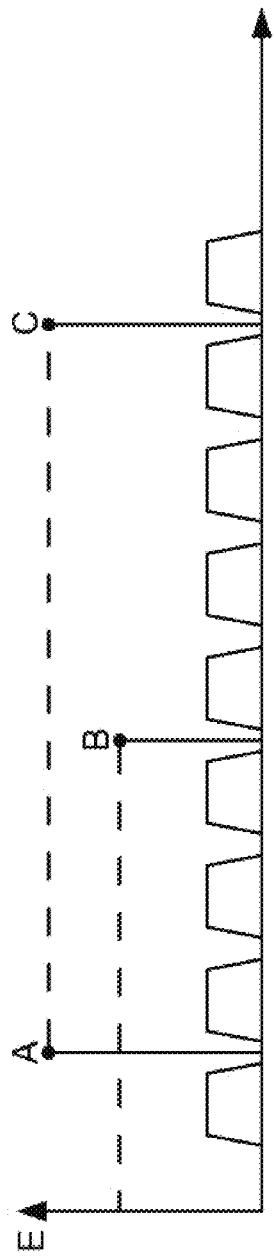
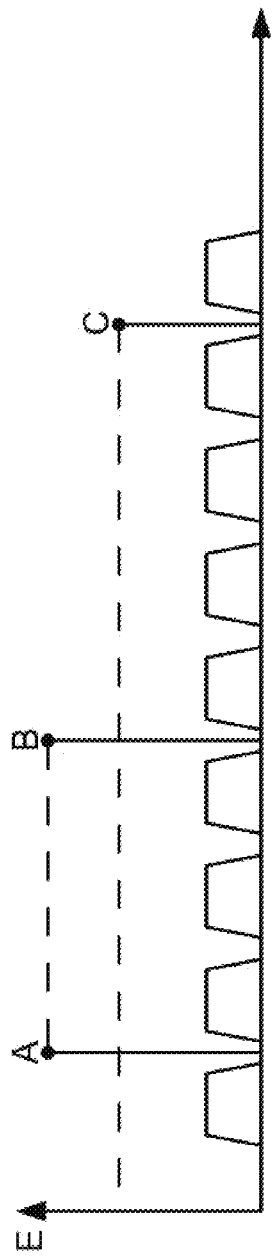

METHOD OF TAGGING SIGNALS USED FOR LEAKAGE DETECTION AND MEASUREMENT IN CABLE TELEVISION NETWORKS AND APPARATUS FOR DETECTION AND/OR MEASUREMENT OF LEAKAGE SOURCES TAGGED WITH THIS METHOD

CROSS-REFERENCE TO RELATED APPLICATIONS

Pursuant to 35 U.S.C §119 and the Paris Convention Treaty, this application claims the benefit of Polish Patent Application No. P.391095 filed Apr. 29, 2010, the contents of which are incorporated herein by reference.

BACKGROUND OF THE INVENTION

1. Field of the Invention

The present invention relates to a method of tagging signals used for leakage detection and measurement in cable television networks as well as apparatus for the detection and/or measurement of leakage sources tagged with this method.

2. Description of the Related Art

Cable television (CATV) systems are commonly used for the transmission and distribution of television and data signals from a headend (a place where the signals are prepared for transmission out onto the cable plant) to end users (subscribers) and for the transmission of data signals (e.g. Internet or telephony) from subscribers to the headend. Coaxial cable distribution systems typically use the 5 MHz to 1 GHz spectrum for the transmission of bi-directional analog and digital services. This spectrum shares frequency allocations with conventional broadcasters and many other terrestrial radio communication systems, including trunked radio systems (TETRA or P.25 used, e.g., by police or fire departments) and the air traffic control communication system.

One problem facing CATV operators is signal leakage. Signal leakage (sometimes called egress) refers to the transmission of signals through the discontinuities in a coaxial cable distribution network. The signals escaping from CATV networks can undesirably interfere with terrestrial radio communication systems, causing possible equipment malfunction (e.g., in civil aviation, emergency services) or problems with signal reception (e.g., interfered terrestrial TV channels). Moreover, each discontinuity radiating the electromagnetic energy from a CATV network forms a receiving antenna through which energy from terrestrial transmitters and other radio frequency sources (so called ingress) can enter the network. Most of leakage sources are also ingress sources. Ingress deteriorates the quality of signals propagating in the CATV network, especially from subscribers to the headend (return path services). Digital transmissions, typical for modern CATV services, are less susceptible to ingress entering the network than analog transmissions. However, a failure in the digital transmission is catastrophic—a subscriber may enjoy the program without any sign of a problem and suddenly experience a complete loss of the service. These are the main reasons for the need of leakage detection and measurement in CATV networks.

Leakage control is vital for CATV network operators. According to local regulations, CATV network operators should detect all leakage sources, determine the localization of leakage points, measure their absolute magnitude, and eliminate the sources which radiate stronger than a specified leakage limit. Currently, many leakage detection devices exist, which typically consist of an antenna and a receiver that is tuned to a frequency (referred as a test frequency) in the CATV signal bandwidth. Such a device usually has a signal strength (the absolute value of the electric field intensity) measurement circuit. A typical method of leakage source detection requires a signal strength measurement on the test frequency. If the signal strength measurement circuit detects a relatively large amplitude signal at a particular location, a leak may be indicated in or near that localization. A technician may use a leakage detector to pinpoint the source of a leak. A corrective action may be taken to remove the leak source from the network.

A drawback of the described leakage detection method lies in its inability to distinguish CATV signals radiated by the system under test from other signals in the same frequency band. For example, the detected signal may be radiated from terrestrial transmitters, other radio frequency sources or CATV networks placed in the same area and belonging to other operators.

There are some methods of differentiating the CATV leakage signals from other signals. The methods described in U.S. Pat. Nos. 4,072,899 and 4,237,486 require an unused CATV channel frequency which is modulated with a unique tagging signal. If the leakage meter detects a relatively large signal, it tries to isolate the distinctive tagging signal. The requirement of the unused channel frequency undesirably consumes valuable CATV network bandwidth and is unacceptable to CATV network operators today.

U.S. Pat. No. 5,608,428 describes a method in which a low frequency tagging signal is modulated onto an active (in-use) video carrier. The method can sometimes cause undesirable signal distortion for analog TV signals. U.S. Pat. No. discloses that it is possible to use the method for digitally modulated signals (like 64-QAM used for digital television and data transmission). However, the power measurement of digitally modulated signal, required for establishing the absolute magnitude of the leakage, is more complicated than the power measurement of a sinusoidal wave. Moreover, the measurement bandwidth for leakage should be very narrow (maximum several tenths of kHz around the test frequency;) in order to reduce interference from other CATV channels or terrestrial radiating sources. Usually, the smaller the bandwidth, the lower the amount of interference. The CATV digital signal has a bandwidth of a few MHz (8 MHz in Europe and 6 MHz in the U.S.A.), so it is much more susceptible to interfering signals. The measurement of the leak magnitude in such a broad bandwidth can give very inaccurate results. Furthermore, this method modifies signals transmitted in a CATV network.

U.S. Pat. Nos. 6,118,975, 6,307,593, 6,600,515 and 6,804,826 describe four leakage tagging methods that insert a tagging signal into a television signal only at times at which control information is present (vertical or horizontal synchronization pulses or quiet lines). The major drawback of all four methods is the fact that they can be used for tagging of analog television channels only. They also modify some signals transmitted in the network.

Recently, a new problem has appeared. Various parts of the network may belong to or be operated by various operators. For example, the main distribution part of a network—from the headend to a particular building—belongs to one operator (O1), and the home wiring inside the building belongs to a building owner (O2). A leakage source can be localized in the building. The mobile leakage patrol organized by O1 can detect this source and coarsely (within a 100-200 m range) determine its localization. The precise localization must be found by a technician and requires time and human resources. Due to the financial reasons, the operator O1, who has carried out the mobile patrol, is not interested in finding the precise localization of the leak sources not belonging to his part of the network. The standard tagging methods, like these described in the U.S. Pat. Nos. 4,072,899, 4,237,486, 5,608,428, 6,118,975, 6,307,593, 6,600,515 and 6,804,826, do not allow the spatial distinguishing of the CATV network part responsible for a particular detected leak source. They can recognize whether the leak source comes from the network under test, but cannot specify a particular network part where the leak source is localized.

Accordingly, there is a need to develop a leakage tagging method that does not require an out-of-use channel, does not modify the signals transmitted in a CATV network, and can be used for digital television channels (DVB-C, DVB-T or similar systems) and channels used for digital data transmission in the DOCSIS and EuroDOCSIS (or similar) systems. The method should also allow an accurate measurement of the absolute leakage magnitude and the determination of the CATV network part (subnetwork) where a detected leakage source lies.

SUMMARY OF THE INVENTION

According to the present invention, the method of tagging the signals used for leakage detection and/or measurement in cable television networks using additional signals transmitted in CATV networks and carrying the tagging information is based on placing a narrowband tagging signal (or signals) in certain free parts of the cable television network frequency spectrum, in particular, in the guard bands of digital and/or analog channels.

In order to suppress the magnitude of the tagging signals, the frequency spectrum of the signals transmitted in a particular subnetwork is shaped in each point connecting individual subnetworks in a way that is characteristic of a particular subnetwork and creates a spectrum signature characteristic of each signal radiated from this particular subnetwork. The tagging signal is narrowband, with the bandwidth being from a few kHz up to several kHz.

The apparatus for leakage detection and/or measurements from cable television networks, tagged according to the method presented in the invention, which uses the principle of signal reception based on frequency conversion, has a narrowband filter (or filters) with a bandwidth from a few kHz up to several kHz for the separation of the tagging signals. The filter output is connected with the microprocessor input. The microprocessor is connected with an antenna switch, a voltage controlled amplifier, a display and a keyboard and has been programmed for sampling and quantizing of the input signal and for the detection of the spectrum components carrying the tagging information.

The microprocessor uses the fast Fourier transform (FFT) or the discrete cosine transform (DCT) algorithm.

The present invention lies without limitation in the placement of a tagging signal within the bandwidth formally occupied by a digital or analog signal used for the transmission of services in a CATV network (in-use channels). At both ends of the bandwidth occupied by the signal in a particular CATV channel, there is always a guard band. There is no useful energy (coming from the modulation process) transmitted in this band. The main purpose of the guard band is the protection of adjacent channels from interference caused by that particular channel and the simplification of receiver filtering circuits. However, if a narrowband tagging signal (or signals) are placed in the guard band, the signal in that particular channel and in the adjacent channels will be unaffected. Digital data/television channels and analog television channels occupy quite a wide frequency band (6-8 MHz) and are not very susceptible to interference caused by narrowband signals. The quality of signals in the adjacent channels will not suffer from the tagging signal due to its being suppressed in the receiver filters.

According to the present invention, any narrowband signal with any type of analog or digital modulation can be used as a tagging signal. For example, a tagging signal can be a sinusoidal wave which is modulated with amplitude. The modulation frequency is low, in the range from 1 to 50 Hz, in order to minimize the bandwidth occupied by the signal. The modulation depth should not exceed 30% in order to minimize the level of the side bands. The usage of a sinusoidal wave simplifies the measurement of the absolute magnitude of the leakage by a leakage meter or detector. The narrowband tagging signal (not only sinusoidal) in the guard band can be extracted in the leakage meter or detector by means of the fast Fourier transform (FFT), the discrete cosine transform (DCT), or a very narrow bandpass filter, which attenuates the spectrum of the particular channel, the adjacent channels, and interfering signals not lying in the tagging signal band. The narrowband tagging signal substantially improves the accuracy of leakage magnitude measurements. Moreover, there is a simple relationship between the sinusoidal wave power level and the power level of a digitally modulated signal with a uniform distribution of the power spectrum density (typical power distribution for digital modulations used in CATV networks). This relationship may be used in leakage meters or detectors to find the leakage level of digital signals which is equivalent to the leakage level of a sinusoidal wave. Leakage standards (e.g., EN 50083-8 in Europe) define leakage limits for a sinusoidal wave only. The above described sinusoidal signal with amplitude modulation is one possible form of the tagging signal.

The present invention finds application in CATV networks with analog and/or digital transmissions. The guard band is also present in analog TV (PAL, SECAM or NTSC standards) channels. According to the invention, the tagging signal will not affect the picture and the sound quality of analog TV channels. If there is a free channel in a CATV network, it may also be used to place the tagging signal.

A greater number of tagging signals, which can be used in the methods described herein, allows determining the subnetwork where a leakage source lies. In this case, the minimum number of tagging signals should be equal to two (distinction of the network part belonging to a major operator and to other operators). The frequencies of the tagging signals should be placed in the unused parts of the CATV network spectrum (free channels or the guard bands of CATV channels). In the point where one part of the network (belonging to one operator) ends and the second part (belonging to another operator) begins there is a filter or any passive or active device (for example, an amplifier with a proper frequency response), which is able to reduce the level of the tagging signals. It may be a narrow stopband (notch) filter, a bandpass filter, a lowpass filter or a highpass filter depending on the spectrum arrangement and the topology of a CATV network.

The notch filter can reduce the amplitude of the tagging signal which is assigned to the particular part of a network (a subnetwork). A leakage detector or meter can detect a leakage source localized in this subnetwork. The amplitudes of all tagging signals except the one suppressed in the notch filter will be relatively high and will create a kind of a signature typical for all leaks from this subnetwork. The signal processing circuit of the meter or detector will recognize the signature of the leak and the subnetwork.

CATV subnetworks may require only a part of the whole spectrum created in the CATV network headend or hub and transmitted in the main (trunk) network. This solution is quite common in practice. The shape of the spectrum is formed in the points connecting the subnetworks with the trunk network. Lowpass filters, bandpass filters, highpass filters, or other devices (e.g. amplifiers) suppress the unwanted parts of the spectrum. If the tagging signals are passed with the wanted spectrum part or suppressed with the unwanted spectrum part, the leakage meter or detector will be able to recognize the specific leak signature constituted of the tagging signals and determine the subnetwork with the detected leak source. The narrowband tagging signal can be extracted in the leakage meter or detector by means of a very narrow bandpass filter, which suppresses all signals not lying in the tagging signal band. It will help to minimize the likelihood of interference by signals falling within the bandwidth of the tagging signal.

The method of tagging the signals used for leakage detection and/or measurement in cable television networks, described herein, can be used in CATV networks, in which all channels are digitally modulated or which include both analog and digital channels. The method does not require an unused channel for leakage tagging, especially in CATV networks, where all transmissions are digital. Furthermore, the method allows for accurate and simple measurement of the leakage magnitude, is sensitive enough to detect an RF leak from the coaxial cable network under test and to ignore leaks or RF interferences from other sources. The method does not modify any signals transmitted in the network and allows to determine the part of the network where a leak source lies.

BRIEF DESCRIPTION OF THE DRAWINGS

Embodiments of the present invention will now be described, by way of example, with reference to the accompanying drawings in which:

FIGS. 4a-c show exemplary frequency spectra of the CATV network which consists of three subnetworks: A, B and C;

DETAILED DESCRIPTION OF THE INVENTION

Figure 1:
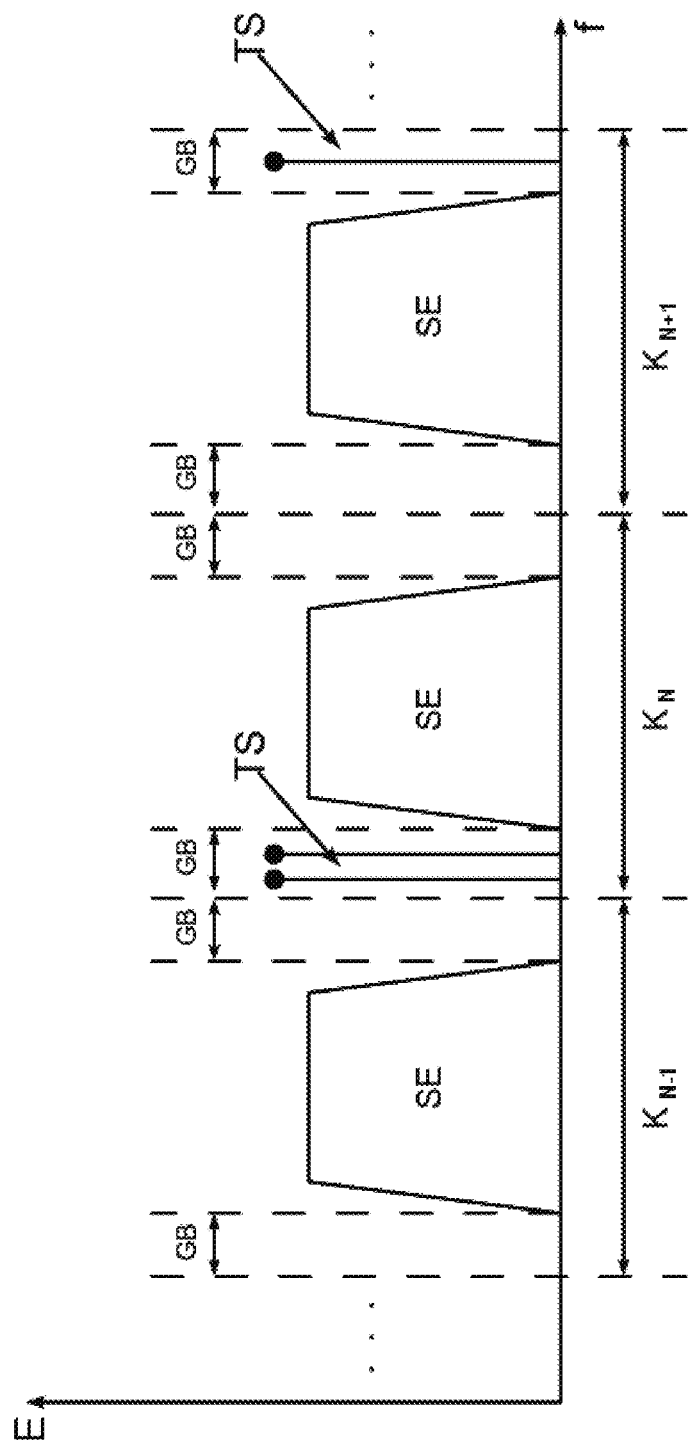
FIG. 1 shows a part of a typical CATV signal frequency spectrum with digital services (three consecutive channels) with the guard band GB and the narrowband tagging signal TS shown.

The energy E distribution in terms of frequency f, typical for digital modulations used in CATV networks, is shown in FIG. 1. The useful signal energy SE is equally distributed almost over the entire CATV channel bandwidth (FIG. 1 shows three consecutive channels $K_{N-1}$, $K_N$, $K_{N+1}$. The guard band GB does not contain energy useful for service transmission. The tagging signal TS is introduced into this part of the spectrum by combining it with all signals in the headend.

Figure 2:
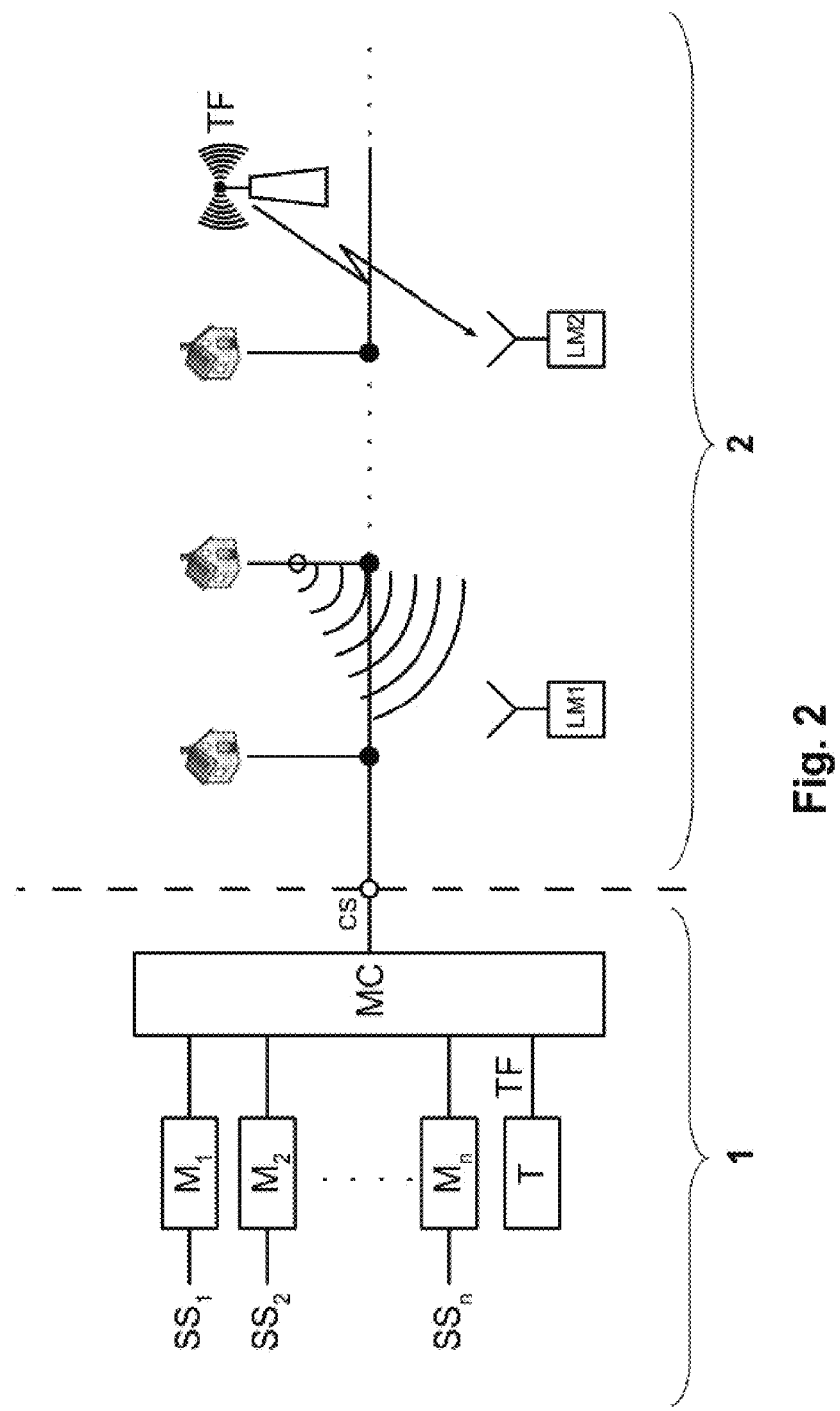
FIG. 2 shows a block diagram of a typical CATV system incorporating the signal tagging method according to the invention.

A typical CATV system shown in FIG. 2 consists of two parts. A complex CATV signal is prepared in the headend 1 for transmission to subscribers in the distribution network 2. The service sources $SS_1$-$SS_n$ (TV, radio, video, data, etc.) are coupled to the input ports of the respective channel modulators ($M_1$-$M_n$), which include carrier frequency generators. The modulators M modulate the service signals into channels for placement in the CATV network. The outputs of the channel modulators M are then coupled to the main combiner MC. The combiner combines all the modulated channel signals into one complex signal CS. The tagger T generates the modulated carrier frequency or frequencies TF. The output of the tagger T is also connected to the main combiner MC.

The complex signal CS is transmitted in the CATV distribution network 2. If there is a leakage source LS, the complex signal CS is radiated from the network structure. The leakage meter or detector LM1 receives a signal on the frequency TF. The meter LM1 measures the leak magnitude and checks whether the tagging information is present on the frequency TF. The meter LM1 will recognize the detected signal as a leakage from the network under test.

Assuming that there is an interference source IS radiating the signal on exactly the same frequency TF as the frequency generated in the tagger T, the leakage meter LM2 can receive the interfering signal. However, the interfering signal does not contain the tagging information, so the received signal will not be recognized as a leak from the network under test.

Figure 3:
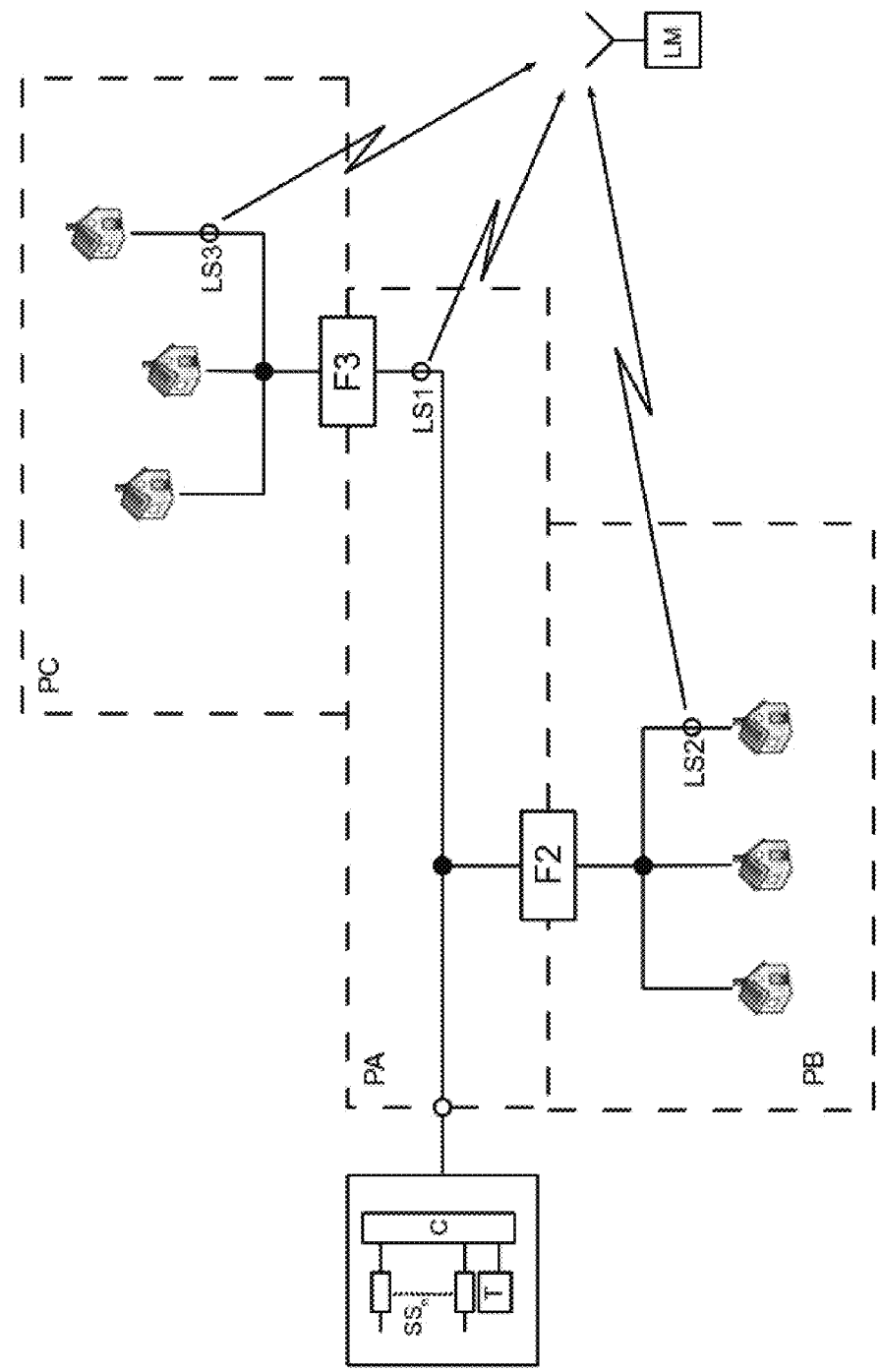
FIG. 3 shows a block diagram of an exemplary CATV network incorporating the signal tagging method according to the invention and consisting of a trunk network (subnetwork A) and two distribution networks (subnetworks B and C)

FIG. 3 shows an example of a CATV network which consists of the headend and three sub-networks (PA, PB and PC). The subnetwork PA is connected with the subnetwork PB via the very narrow stopband filter FB and with the subnetwork PC via a similar stopband filter FC having a different center frequency. In the headend, the tagger T output is connected to the main combiner C together with the service signals $SS_1$-$SS_n$. The tagger T generates three narrowband, modulated tagging signals A, B and C, as shown in FIGS. 4a-c. The complex signal is transmitted though the network. A leakage meter or detector can be moved along all the branches of the network. Let us assume that there are three leakage sources: the first one, LS1, in the subnetwork PA, the second one, LS2, in the subnetwork PB, and the third one, LS3, in the subnetwork PC. The leakage meter LM can receive the signal radiated by the leak source LS1. The signal spectrum will contain three tagging signals with the equal amplitude, as shown in FIG. 4a, or with the amplitude ratio A:B:C exactly the same as the ratio generated in the tagger T. The meter LM should know this ratio and may learn it during a meter calibration procedure in the headend or subnetwork PA. This is the spectral signature of the signals radiated from the subnetwork PA. The narrow stopband filter F2 reduces the amplitude of the tagging signal B, while the filter F3 suppresses the amplitude of the tagging signal C. If the meter LM receives the signal from the source LS2, it will see the signal signature shown in FIG. 4b. Thus, the signal processing circuit of the meter LM can recognize the leak as radiated from the subnetwork PB. Similarly, if the meter LM receives the signal signature from the source LS3, shown in FIG. 4c, it will recognize it as one coming from the subnetwork PC. The tagging information carried by the tagging signals allows for the recognition of the signals coming from the network being tested. If the meter LM does not recognize the tagging information (interference on the frequencies of the tagging signals), the received signal will be ignored and the leak will not be detected.

Figure 5:
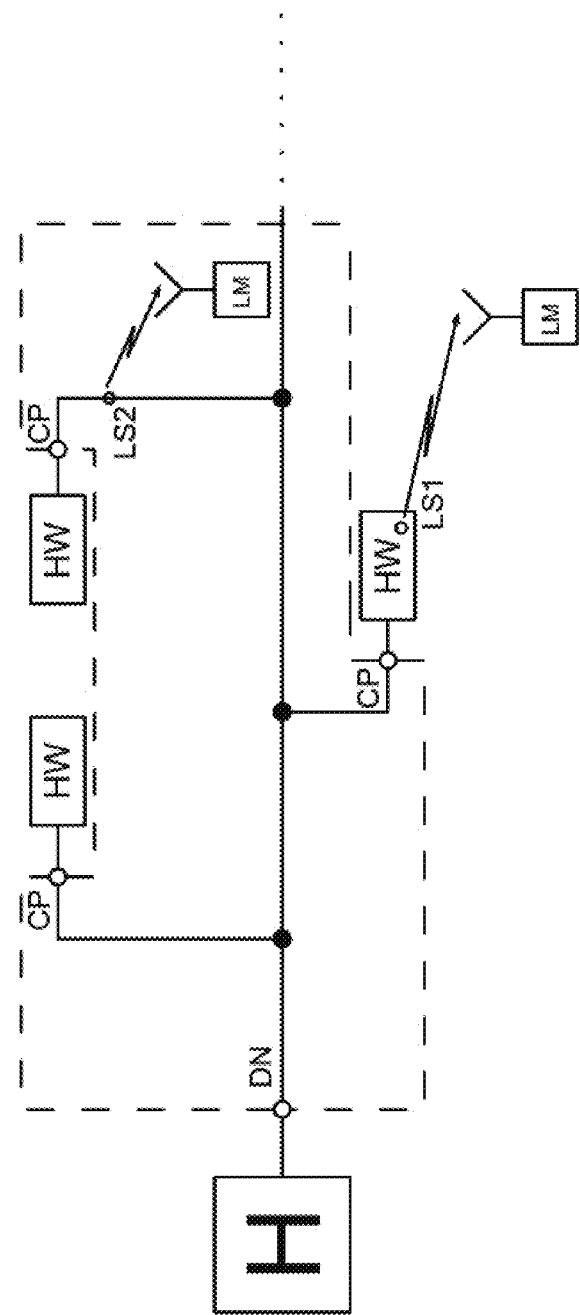
FIG. 5 shows a block diagram of an exemplary CATV network incorporating the signal tagging method according to the invention and consisting of one trunk network and many subnetworks (home wirings in subscribers' homes)

FIG. 5 presents a CATV network topology, which is currently quite common in many countries. It consists of two parts. The first part is the main distribution network DN belonging to one operator. The second part consists of the home wirings HW in subscribers' homes. The home wirings HW are connected to the distribution network DN via the connecting points CP. The tagger in the headend H generates two tagging frequencies—one slightly below the radio FM band (e.g., 80 MHz), and the second frequency in the III TV band (e.g., 115 MHz). Both tagging signals should be modulated with the tagging information. However, one of them (the one which will be suppressed in the home wirings—in our case, it is the 80 MHz signal) does not have to be modulated if there are no strong interference sources (for example terrestrial transmitters around 80 MHz). The connection points CP should contain a passive or active device reducing the signal amplitude on the first frequency (e.g., a highpass filter with 88 MHz cutoff frequency in our case). The filter should suppress the first frequency signal amplitude at least 6-10 dB. The leakage meter or detector LM should be calibrated in the headend H or in the distribution network DN in order to learn the amplitude ratio of the tagging signals on the first and second frequency. If the meter LM receives the signal radiated from the leakage source LS1, it will recognize that the 80 MHz tagging signal amplitude is reduced, so the amplitude ratio of the tagging signals differs from the ratio measured in the headend. As a consequence, the meter LM will recognize the leak as one coming from the second part of the network (not belonging to DN). Similarly, if the meter LM receives the signal leaking from LS2, it will recognize it as one coming from the DN part of the CATV network.

Figure 6:
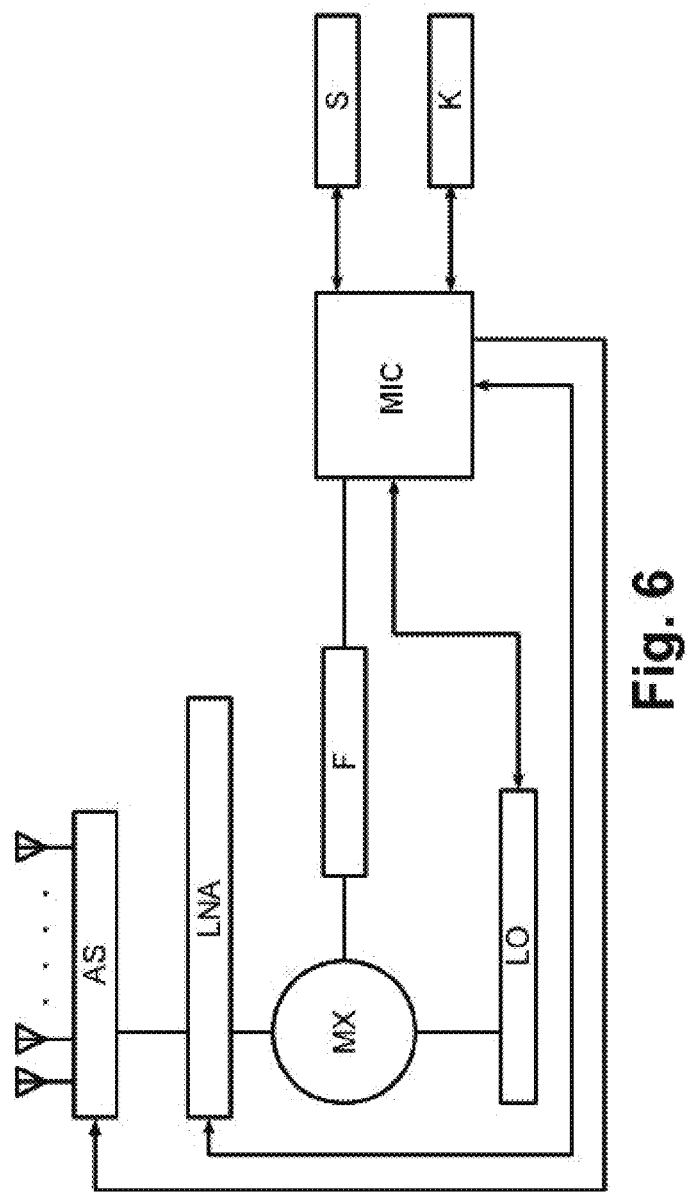
FIG. 6 shows a block diagram of a leakage meter and/or detector for leakage detection from CATV network which incorporates the method of signal tagging according to the invention.

FIG. 6 presents a block diagram of the leakage meter and/or detector which uses the method of signal tagging according to the invention. The apparatus for leakage measurement and/or detection according to the method described herein has good sensitivity, dynamic range and the detection ability of tagging signals which are placed in the narrow guard band GB. There is an antenna switching circuit AS at the input of the apparatus. The meter and/or detector has a built-in internal antenna and allows for the connection of external measurement antennas (e.g., kept in hand or placed on a vehicle roof). The signal received by the antenna is amplified in the input low noise amplifier LNA. In order to reduce the noise level generated inside the meter/detector and to enlarge the dynamic range, the input attenuator typical for similar meters has not been installed. The amplified signal appears at the input of the mixer MX. The second input of the mixer is connected to the variable local oscillator LO. The mixer MX shifts the input signal on the frequency axis by the frequency of the local oscillator signal. The signal at the mixer output has the frequency lying within the bandwidth of the narrowband filter F (the bandwidth is from a few kHz up to several kHz). The filter F attenuates all the signals lying outside the guard band GB and coming from the CATV network under test or terrestrial sources which can interfere with the tagging signal. The parameters of the filter F (bandwidth, frequency response slope) have substantial influence on the correct detection and measurement of the leaking signal. The output signal of the filter F enters the input of the microprocessor MIC. The microprocessor MIC has control functions (it controls the antenna switch AS, the amplifier LNA, the oscillator LO, the screen S, and the keyboard K) and digitally processes the signals. The digital signal processing in the microprocessor MIC comprises sampling and quantization of the input signal as well as the recognition of the spectrum components carrying the tagging information. The detection of the spectrum components with the tagging information (introduced during the narrowband modulation of the tagging signal in the tagger T) is based on the fast Fourier transform (FFT) algorithm.

The components of the apparatus for leakage measurement and/or detection described above, or equivalents thereof which may be recognized by a skilled artisan, collectively and individually constitute means for detecting a narrowband tagging signal or signals.

Due to this processing method, a very good sensitivity of tagging signal detection can be achieved. The microprocessor MIC also determines the amplitude of the received leakage signal. Information about the leak magnitude and the presence of the tagging signal is displayed on the screen of the apparatus. The usage of the microprocessor allows for the correction of the systematic errors. The correction values added to the measurement results are saved in the microprocessor memory during the periodical calibration of the meter/detector.

An alternative example of the leakage meter/detector embodiment according to the invention has a different microprocessor program, which uses the discrete cosine transform (DCT) for detection of the spectrum components carrying the tagging information. The high sensitivity of the tagging signal detection has also been achieved.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

The invention claimed is:

1. A method of tagging signals for leakage detection and leakage measurement, the signals being transmitted in cable television networks, the cable television networks jointly comprising a frequency spectrum that comprises a plurality of cable television channels and a guard band, and a plurality of subnetworks including a first subnetwork, a second subnetwork, and a third subnetwork, the method comprising:

1) placing in the guard band a first narrowband tagging signal, a second narrowband tagging signal, and a third narrowband tagging signal, each having an amplitude, wherein the first narrowband tagging signal, the second narrowband tagging signal, and the third narrowband tagging signal have the same amplitude and have different center frequencies with respect to one another; and creating tagging information for the first narrowband tagging signal, the second narrowband tagging signal, and the third narrowband tagging signal by amplitude-modulating the first narrowband tagging signal, the second narrowband tagging signal, and the third narrowband tagging signal with a modulation depth of less than 30% and a modulation frequency of between 1 Hz and 50 Hz;

2) obtaining a spectral signature of signals transmitted in the second subnetwork by reducing the amplitude of the second narrowband tagging signal in the second subnetwork to be lower than the amplitude of the first narrowband tagging signal in the second subnetwork and to be lower than the amplitude of the third narrowband tagging signal in the second subnetwork; and 3) obtaining a spectral signature of signals transmitted in the third subnetwork by reducing the amplitude of the third narrowband tagging signal in the third subnetwork to be lower than the amplitude of the first narrowband tagging signal in the third subnetwork and to be lower than the amplitude of the second narrowband tagging signal in the third subnetwork.

2. A method of tagging signals for leakage detection and leakage measurement, the signals being transmitted in cable television networks, the cable television networks jointly comprising a plurality of subnetworks and a frequency spectrum that comprises a plurality of cable television channels and a guard band, the method comprising:

1) placing a plurality of narrowband tagging signals in the guard band, wherein the plurality of narrowband tagging signals has the same number of signals as the plurality of subnetworks, and the plurality of narrowband tagging signals has the same amplitude and has different center frequencies with respect to one another; and creating tagging information for the plurality of narrowband tagging signals by amplitude modulating the plurality of narrowband tagging signals with a modulation depth of less than 30% and modulation frequency of between 1 Hz and 50 Hz;

2) obtaining a spectral signature of signals transmitted in one of the plurality of subnetworks by reducing an amplitude of the one of the plurality of narrowband tagging signals in the one of the plurality of subnetworks to be lower than amplitudes of the remaining narrowband tagging signals in the one of the plurality of subnetworks; and 3) obtaining spectral signatures of signals transmitted in all of the plurality of subnetworks by repeating 2) for the remaining subnetworks.

* * * * *